(12) United States Patent
Strobel et al.

(10) Patent No.: US 10,116,350 B2
(45) Date of Patent: *Oct. 30, 2018

(54) CHANNEL ESTIMATION

(71) Applicant: Lantiq Deutschland GmbH, Neubiberg (DE)

(72) Inventors: Rainer Strobel, Munich (DE); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,812

(22) Filed: Feb. 27, 2017

(65) Prior Publication Data

US 2017/0331514 A1 Nov. 16, 2017

Related U.S. Application Data

(63) Continuation of application No. 14/062,983, filed on Oct. 25, 2013, now Pat. No. 9,584,181.

(Continued)

(51) Int. Cl.
*H04B 3/46* (2015.01)
*H04B 17/00* (2015.01)
(Continued)

(52) U.S. Cl.
CPC .............. *H04B 3/32* (2013.01); *H04B 1/62* (2013.01); *H04B 17/00* (2013.01); *H04L 5/006* (2013.01); *H04L 5/0044* (2013.01); *H04L 25/00* (2013.01); *H04L 25/0204* (2013.01); *H04L 25/0206* (2013.01); *H04L 25/0226* (2013.01);
(Continued)

(58) Field of Classification Search
CPC .... H04L 27/2613; H04J 13/0048; H04B 3/32; H04B 3/464
See application file for complete search history.

(56) References Cited

U.S. PATENT DOCUMENTS 6,144,696 A 11/2000 Shively et al.
6,226,337 B1 5/2001 Klank et al.
(Continued)

FOREIGN PATENT DOCUMENTS

CN 1630283 A 6/2006
CN 102299894 A 12/2011
(Continued)

OTHER PUBLICATIONS

Manuel Flury, et al.: "Robust IEEE 802.15.4a energy detection receiver using statistical interference modeling", Signals, Systems and Computers, 2009 Conference Record of the Forty-Third Asilomar Conference on, IEEE, Piscataway, NJ, US, Nov. 1, 2009, pp. 952-956, XP031679551, ISBN: 978-1-4244-5825-7.

(Continued)

*Primary Examiner* — Shuwang Liu
*Assistant Examiner* — Sung Ahn
(74) *Attorney, Agent, or Firm* — Eschweiler & Potashnik, LLC

(57) ABSTRACT

Methods and devices related to channel estimation for a communication system comprising a plurality of communication connections are provided. For channel estimation, test sequences are used having three different elements, for example −1, 0 and +1.

10 Claims, 2 Drawing Sheets

Related U.S. Application Data

(60) Provisional application No. 61/720,044, filed on Oct. 30, 2012.

(51) Int. Cl.
*H04Q 1/20* (2006.01)
*H04B 3/32* (2006.01)
*H04L 25/02* (2006.01)
*H04L 5/00* (2006.01)
*H04L 25/00* (2006.01)
*H04B 1/62* (2006.01)
*H04L 25/03* (2006.01)

(52) U.S. Cl.
CPC .. *H04L 25/03159* (2013.01); *H04L 25/03343* (2013.01); *H04L 2025/03426* (2013.01)

(56) References Cited

U.S. PATENT DOCUMENTS

| | | | |
|---|---|---|---|
| 7,843,949 B2 | 11/2010 | Xu | |
| 8,817,907 B2 | 8/2014 | Sorbara et al. | |
| 8,854,942 B2 | 10/2014 | Goodson et al. | |
| 2003/0179698 A1* | 9/2003 | Lu | H04B 1/7097 370/209 |
| 2003/0223505 A1 | 12/2003 | Verbin et al. | |
| 2005/0220180 A1 | 10/2005 | Barlev et al. | |
| 2006/0002457 A1 | 1/2006 | Romano et al. | |
| 2006/0274824 A1 | 12/2006 | Kroninger et al. | |
| 2007/0280334 A1 | 12/2007 | Lv et al. | |
| 2008/0049855 A1 | 2/2008 | Duvaut et al. | |
| 2009/0046568 A1 | 2/2009 | Xu | |
| 2009/0175156 A1* | 7/2009 | Xu | H04B 3/32 370/201 |
| 2010/0046738 A1 | 2/2010 | Schelstraete et al. | |
| 2010/0177838 A1 | 7/2010 | Schenk | |
| 2010/0195478 A1* | 8/2010 | Schenk | H04B 1/7075 370/201 |
| 2010/0195480 A1 | 8/2010 | Zhou et al. | |
| 2010/0232486 A1 | 9/2010 | Starr et al. | |
| 2011/0026575 A1 | 2/2011 | Shalom et al. | |
| 2011/0122767 A1 | 5/2011 | Dent | |
| 2011/0235759 A1 | 9/2011 | Pierrugues et al. | |
| 2012/0269289 A1 | 10/2012 | Schenk | |
| 2015/0071336 A1 | 3/2015 | Kerpez et al. | |

FOREIGN PATENT DOCUMENTS

| | | |
|---|---|---|
| WO | 0113595 A1 | 2/2001 |
| WO | 02100008 A1 | 12/2002 |
| WO | 2005088882 A1 | 9/2005 |

OTHER PUBLICATIONS

Nevio Benvenuto, et al.: "Linear Precoding for Downlink MC-CDMA Systems", IEEE Wireless Communications and Networking Conference, 2007, WCNC 2007; Mar. 11-15, 2007, Hong Kong, IEEE Operations Center, Piscataway, NJ, Mar. 1, 2007, pp. 622-627, XP031088605, ISBN: 978-1-4244-0658-6.

Le-Nam Tran, et al.: "Beamformer designs for zero-forcing dirty paper coding", Wireless Communications and Signal Processing (WCSP), 2011 International Conference on, IEEE, Nov. 9, 2011, pp. 1-5, XP032101157, DOI: 10.1109/WCSP.2011.6096955, ISBN: 978-1-4577-1009-4.

Di Wu et al: "Ternary complementary sets for orthogonal pulse based UWB", Conference Record of the 37th. Asilomar Conference on Signals, Systems, & Computers. Pacific Groove, CA, Nov. 9-12, 2003; [Asilomar Conference on Signals, Systems and Computers]; New York, NY: IEEE, US, vol. 2, Nov. 9, 2003 (Nov. 9, 2003), pp. 1776-1780, XP010702645, DOI: 10.1109/ACSSC.2003.1292259, ISBN: 978-0-7803-8104-9, p. 1777-1778.

Partial European Search Report dated Jan. 19, 2016 for parallel EP application 13 190 648.9.

Partial European Search Report dated Jan. 8, 2016 for parallel EP application 13 190 642.2.

Extended European Search Report dated Jun. 7, 2016 for parallel EP application 13 190 648.9.

Final Office Action dated Jun. 2, 2016 for parallel U.S. Appl. No. 14/062,985.

Extended European Search Report dated Jul. 12, 2016 for parallel EP application 13 190 642.2.

Office Action dated Dec. 4, 2014 for U.S. Appl. No. 14/062,985.
Office Action dated Aug. 26, 2015 for U.S Appl. No. 14/062,985.
Notice of Allowance dated Oct. 17, 2016 for U.S. Appl. No. 14/062,983.

Final Office Action dated Mar. 30, 2016 for U.S. Appl. No. 14/062,983.

Non-Final Office Action dated Nov. 5, 2015 for U.S. Appl. No. 14/062,983.

Final Office Action dated Apr. 10, 2015 for U.S. Appl. No. 14/062,983.
Non-Final Office Action dated Oct. 7, 2014 for U.S. Appl. No. 14/062,983.

\* cited by examiner

CHANNEL ESTIMATION

RELATED APPLICATIONS

This application is a continuation of U.S. patent application Ser. No. 14/062,983 filed on Oct. 25, 2013 which claims the benefit of U.S. Provisional Application No. 61/720,044 filed Oct. 30, 2012, the contents of which are herein incorporated by reference in their entirety.

FIELD

The present application relates to channel estimation, i.e. to the estimation of properties of communication channels like wireline channels or wireless channels.

BACKGROUND

In MIMO (Multiple Input Multiple Output) transmission systems like wireless LAN (Local Area Network) or vectored DSL (Digital Subscriber Line), training sequences are required to estimate the transmission channels, e.g. properties of connections used for data transmission, and crosstalk channels (e.g. strength of crosstalk) between all transmitters and receivers, and calculate channel equalizer and crosstalk precompensator/canceller coefficients according to the channel estimation.

For high frequency wired transmission, such as used in modern DSL lines that serve the last distance of the fiber to the distribution point (FTTdp) networks, channel estimation is required to be fast due to fast system reconfigurations, but also requires high precision to achieve high data rates.

In wireless systems, short training pulses are used for channel estimation. This is required for such systems, because the channel quickly changes over time and the channel estimation must be repeated very often, practically for each transmission. The dimension of the MIMO channel is defined by the number of antennas at transmitter and receiver side, which is a small number, usually from two to four. By sending one pulse on each transmit antenna while all receivers are listening, a complete channel estimation is performed in a short time or a single pulse, creating only little overhead. The disadvantage of the method is low accuracy and only very small number of systems to address.

In vectored DSL, the channel is much more stable that the wireless channel, but channel estimation requires very high precision to cancel crosstalk and the number of disturbers is very high comparing to wireless (up to hundreds). Since a DSL wireline channel is rather static over time, in modern DSL (ITU-T G.993.5) Walsh-Hadamard (WH) sequences are used for FEXT channel estimation. To reduce transmission overhead, the WH sequences used for channel estimation are spread over time, but this increases the FEXT estimation time accordingly. A complete channel estimation sequence of a 512-pair cable binder may take as much as 30 s and even more, which is obviously inconvenient and even impractical if the system requires more frequent updates.

In FTTdp deployment, there are often network topologies where multiple distribution points (DPs) share the same cable binder. Therefore, the channel estimation method must be able to measure crosstalk between different, non co-located, distribution points.

SUMMARY

Some embodiments relate to techniques for channel estimation, where test sequences used have values selected from a set of three values, e.g. (−1, 0, +1). In some embodiments, this allows for greater flexibility and additional possibilities compared to conventional approaches using Walsh-Hadamard sequences of values of e.g. only +1 or −1.

The above brief summary is intended to give an overview of some features of some embodiments and is not to be construed as limiting. In particular, other embodiments may use other features, additional features and/or alternative features compared to the above-described embodiments, such that the above features are not to be construed as essential for implementing embodiments.

DETAILED DESCRIPTION

In the following embodiments will be described in detail. It should be noted that these embodiments are not to be construed as limiting, but are merely given as implementation examples. For example, while embodiments may be described as comprising a plurality of specific features, in other embodiments some of these features may be omitted, or may be replaced by alternative features. In yet other embodiments, additionally or alternatively additional features may be present.

Some of the embodiments described in the following relate to channel estimation which may be for example used to determine far end crosstalk (FEXT) between communication channels like wireline connections, wireless connections or certain carriers on such connections. Based on these determinations, crosstalk reduction by joint processing of signals for or on different connections, sometimes, e.g. in the context of DSL, also referred to as vectoring, may be performed.

Figure 1:
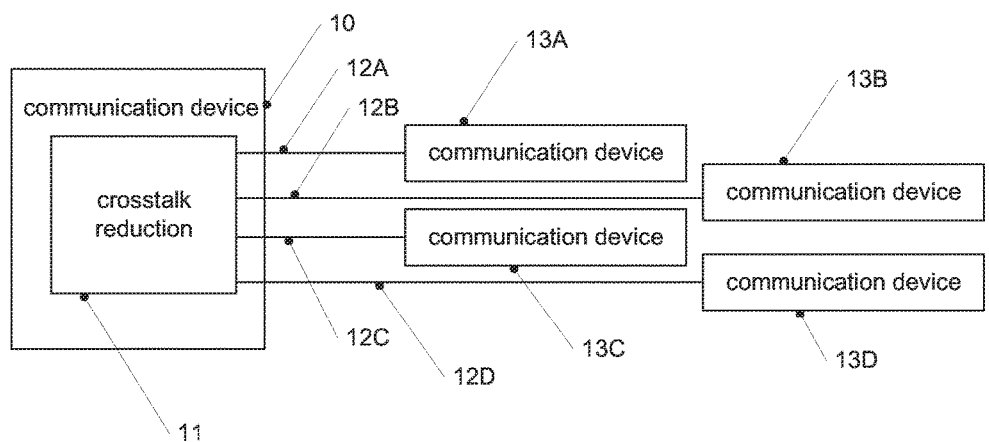
FIG. 1 shows a schematic block diagram of a communication system according to an embodiment.

To illustrate this, in FIG. 1 a communication system according to an embodiment is schematically shown. In the communication system of FIG. 1, a communication device 10 which may be part of a central office (CO) equipment or part of a distribution point (DP), but may also be used for other purposes or in other environments, communicates with a plurality of communication devices 13A-13D over a plurality of communication connections 12A-12D. Communication devices 13A-13D will collectively be referred to as communication devices 13. Communication connections 12A-12D will be collectively referred to as communication connections 12. Communication connections 12 in embodiments may e.g. be wireline connections like copper lines, or may be wireless connections. In some embodiments, communication connections 12 may be twisted copper line pairs. In some embodiments, communication devices 10 and 13 may be communication devices communicating via wire-based communication connections 12 using a discrete multi-tone modulation (DMT) technique like a xDSL technique (ADSL, ADSL2, VDSL, etc.) or other DMT-based techniques. However, other techniques and modulation schemes may also be used. In an embodiment, the signals exchanged between communication device 10 and communication devices 13 may be centrally processed for crosstalk reduction in a crosstalk reduction arrangement 11, which may be implemented in hardware, software or a combination of the two in communication device 10. Other implementations are also possible.

In the context of the present application, a communication direction from equipment which is provided by a service provider, like central office equipment or a distribution point, towards end users will be referred to as downstream direction, whereas the opposite communication direction will be referred to as upstream direction, as common in the art. Techniques disclosed herein may be employed both for downstream direction and for upstream direction unless specifically noted otherwise. For example, in the embodiment of FIG. 1, the downstream direction corresponds to a communication from communication device 10 to communication devices 13, whereas the upstream direction corresponds to a communication from communication devices 13 to communication device 10.

To perform a channel estimation in downstream direction, test signal sequences, in this context also referred to as channel estimation sequences, may e.g. be sent from communication device 10 to communication devices 13 via communication connections 12. Communication devices 13 may compare the received test sequences, which are known, to nominal values (i.e. the original test sequences) and report error values back to communication device 10. Communication device 10 based on the received information may for example determine equalizer coefficients which may be used to update equalizers used (not shown). Alternatively or additionally, the received information may be used to determine crosstalk coefficients describing for example far end crosstalk (FEXT) and update crosstalk reduction arrangement 11 accordingly. In operation, then crosstalk reduction arrangement 11 jointly processes signals to be sent via communication connections 12 to reduce crosstalk. This joint processing in downstream direction is also referred to as crosstalk precompensation, as the signals are processed for crosstalk reduction before crosstalk actually occurs.

Conversely, for the upstream direction communication device 13 may sent known test sequences to communication device 10. Communication device then may compare the received test sequences to the expected or nominal test sequences and calculate error values, which may again be used for channel estimation and therefore for example for determining equalizer coefficients or for determining FEXT coefficients. Such FEXT coefficients again may be used to update crosstalk reduction arrangement 11. Crosstalk reduction in the upstream direction is also referred to as crosstalk cancellation, as the joint processing for crosstalk reduction occurs after the signals have experienced crosstalk for example while being transmitted via communication connection 12.

Conventionally, for example Walsh-Hadamard sequences consisting of values of −1 and +1 are sometimes used for channel estimation. However, in embodiments discussed herein test sequences where each element of the test sequences has one of three possible values, for example +1, 0 or −1, are employed. In embodiments, such test sequences offer additional possibilities compared to conventional sequences like Walsh-Hadamard sequences, as will be described further below in more detail. Test sequences for different communication connections like different ones of communication connections 12 may be orthogonal to each other in some embodiments.

It should be noted that the number of four communication devices 13 serves only as an example, and any number of communication devices may be employed. Also, other kinds of system configuration, some of which will be explained in some more detail further below, may be employed.

Figure 2:
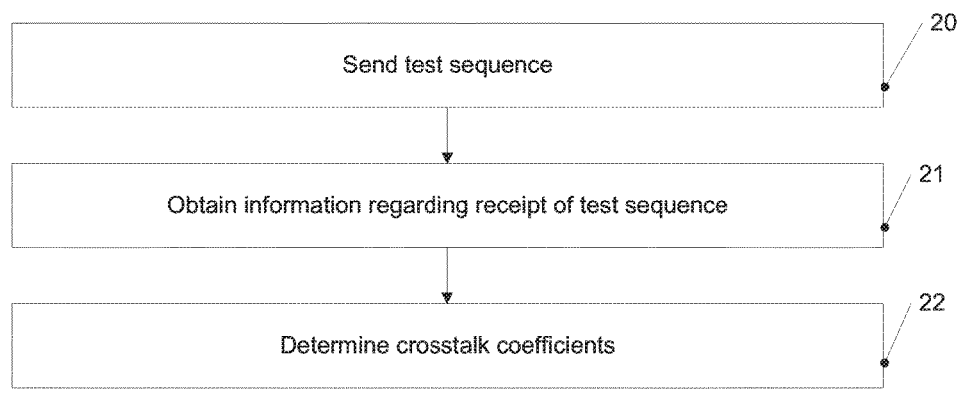
FIG. 2 shows a flowchart illustrating a method according to an embodiment.

Turning to FIG. 2, a method according to an embodiment is shown. The method of FIG. 2 may be implemented in hardware, software, firmware or combinations thereof, for example in hardware, software or firmware related to communication systems or devices. For example, the method of FIG. 2 may be implemented in devices and systems as described above with respect to FIG. 1 or as described further below with reference to FIGS. 3 and 4, but is not limited thereto.

At 20, test sequences are sent over a plurality of communication connections, for example in a downstream direction or in an upstream direction. Test sequences for different communication connections like wireline connections or wireless connections may be orthogonal to each other. In embodiments, test sequences are used wherein the elements of the test sequences are chosen from three possible values, for example −1, 0 and +1.

At 21, information regarding receipt of the test sequences is obtained, for example error values characterizing a difference between the received test sequences and the expected (nominal) test sequences.

At 22, this information is used for example to determine crosstalk coefficients for crosstalk precompensation or crosstalk cancellation, or to obtain other information necessary for optimizing or setting up communication channels, for example equalizer settings.

Figure 3:
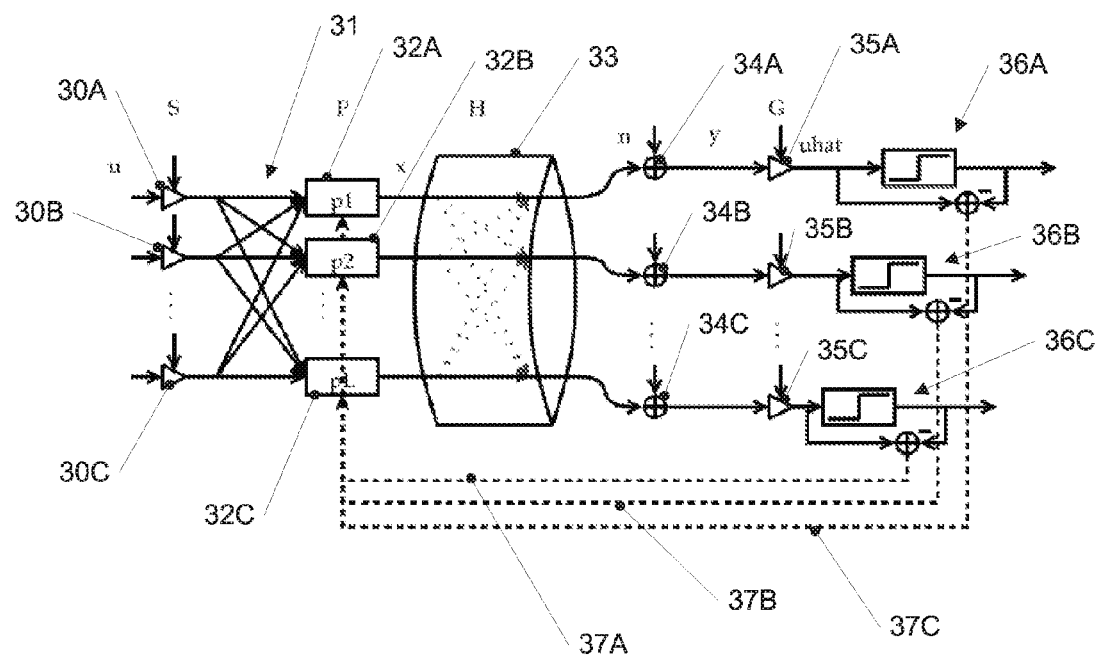
FIG. 3 is a diagram illustrating crosstalk precompensation in some embodiments.

To illustrate this further, in FIG. 3 a somewhat more detailed diagram of a system illustrating channel estimation in downstream direction is shown. In FIG. 3, a transmit signal vector u contains as its elements transmit signals to be transmitted over a plurality of communication lines, three of which are schematically shown in FIG. 3. Elements pertaining to the first shown transmission line have an A added after the reference numeral, elements pertaining to the second transmission lines have a B added, and elements pertaining to the third transmission line have a C added. However, it is to be noted that the number of three transmission lines shown serves merely as an example, and any number of transmission lines may be present, for example between two and some hundred transmission lines.

Similar elements present in the different transmission lines will be collectively referred to by their reference numeral without the letter. For example, elements 30A, 30B and 30C will collectively be referred to using reference numeral 30.

In the example of FIG. 3 with three communication connections, vector u may have three components, one for each connection. In other embodiments, on each communication connection a plurality of carriers, also referred to as tones, may be used, for example for a DMT modulation technique. In this case, u may have components for each carrier of each communication connection, although this need not be the case.

In scaling elements 30, the components of transmit signal vector u are scaled by scaling factors, which may be represented by multiplying the vector u with a diagonal matrix S and which may constitute a gain adjustment or adjustment of the power spectral density (PSD). Thereafter, a crosstalk precompensation is performed, which couples the channels at a transmitter side and which in some implementations may be represented by multiplying with a precoder matrix P in a crosstalk precompensator 33.

During transmission, as indicated by 33, the transmitted signal may be subject to crosstalk like far end crosstalk (FEXT), which may be represented by multiplying with a channel matrix H which e.g. characterizes crosstalk couplings in non-diagonal elements. Through channel estimation, essentially this matrix H may be at least approximately determined and be used for the calculation of P such that the crosstalk is reduced or eliminated, i.e. such that P essentially compensates the effect of H.

Furthermore, as represented by adders 34 the signal transmitted may be subject to additive noise which may be represented by a noise vector n. At a receiver side, the received signal may be amplified in amplifiers 35 with respective gain factors, which may be represented by a diagonal matrix G. Noise is also amplified. Therefore, a received signal vector û may in this system model be written as $\hat{u} = G \cdot H \cdot P \cdot S \cdot u + G \cdot n$.

In receiver components 36, the received signals are processed to recover the data additionally sent. As represented by subtractors of components 36, errors may be determined and fed back via feedback path 37 to for example update the matrix P. This in particular is done by sending known test sequences, as mentioned above, wherein in embodiments the test sequences contain elements selected from three values, e.g. (−1, 0, +1). Determination of the matrix P based on channel estimation may then be performed by conventional algorithms like least mean square algorithms (LMS) or zero forcing algorithms.

Figure 4:
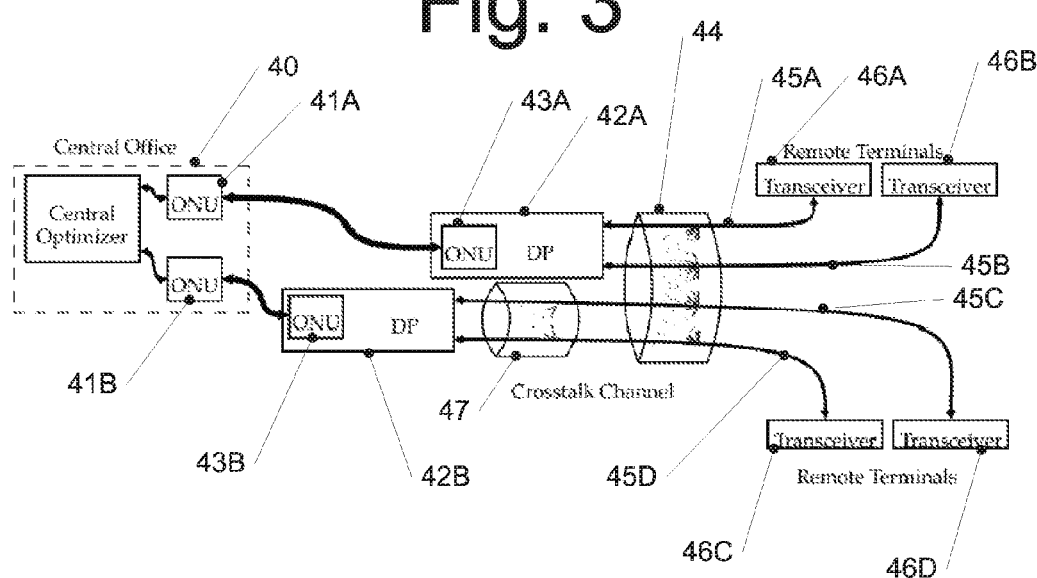
FIG. 4 is a more detailed block diagram of a communication system according to an embodiment.

In FIG. 4, a more detailed diagram of a communication system according to an embodiment where techniques disclosed herein may be employed is shown. In the system of FIG. 1 which illustrate an example for an access network topology a central office 40 serves distribution points 42A, 42B (collectively referred to as distribution points 42) via fiber optical connections. To achieve this, central office 40 comprises optical network units (ONU) 41A, 41B, and distribution points 42 comprise optical network units 43A, 43B, respectively. Distribution points are usually located nearby customer premises to be served and may for example be installed in street cabinets and the like. Central office 40 may comprise a central optimizer which optimizes and coordinates transmission to the different distribution points. Each distribution point 42 serves a number of remote terminal transceivers 46A to 46D. In the simple example shown, distribution point 42 serves remote terminal transceivers 46A, 46B, and distribution point 42B serves remote terminal transceivers 46C, 46D. The number of two transceivers 46 for each distribution point serves merely as an example and has been selected for ease of representation, and more transceivers may be served, for example typically between one and twenty terminals although this number is not particularly limited, and different numbers of transceivers may be served by different distribution points. Communication connections between distribution points 42 and transceivers 46 are typically copper lines or other wireline-based communication connections, although not limited in this respect. Communication connections assigned to one distribution point are prone to crosstalk like far end crosstalk (FEXT), as indicated by 47 in FIG. 4. Also, communication connections assigned to different distribution points may influence each other via crosstalk like FEXT as indicated by 44 in FIG. 4, e.g. if they are located in a same binder, although the crosstalk between communication connections assigned to different distribution points in many cases will be weaker than crosstalk between communication connections assigned to the same distribution point, as connections assigned to the same distribution point are usually physically closer to each other, which makes them more prone to crosstalk. However, this is not necessarily the case in all scenarios.

Using test sequences for channel estimation using three possible values like −1, 0 and +1 in some embodiments allows for a partial deactivation of some communication connections for the purposes of channel estimation, such that an estimation may be tailored to a respective deployment scenario. Various possibilities for construction of such test sequences and their use in various scenarios and for various purposes will now be described in more detail.

In the following, more detailed explanations will be given regarding the possible construction and use of test sequences for channel estimation comprising elements selected from three possible values, for example −1, 0 and +1, according to some embodiments.

Generally, in some embodiments, for wideband wired transmission, the advantage of a slowly time-varying channel is used to achieve high accuracy of the channel estimation over time. In some embodiments, due to the requirement of dynamic system reconfigurations, it is also required to perform fast estimation of the channel matrix, for both crosstalk and the direct channel. Besides, operation with crosstalk that is higher than the received signal is in some cases required, and scenarios in which multiple distribution points share the same cable binder causing e.g. crosstalk as indicated at 44 in FIG. 4 is addressed in some embodiments. In embodiments, this is achieved by using pilot sequences (test sequences) that, besides +1 and −1 values, as Walsh-Hadamard(WH) sequence, include also 0 (zero) values, providing no signal on a particular tone(s) over the particular line(s) is transmitted. The sequences in some embodiments are specially designed to reduce transmission time and increase the accuracy.

First of all, example embodiments for creating orthogonal sequences with elements +1, −1 and 0 will be described. It is to be noted that these embodiments serve as examples only, and in other embodiments other techniques may be employed for generating sequences to be used as test sequences, e.g. channel estimation sequences, for example in the form of pilot sequences.

There are different methods to create orthogonal sequences with the elements +1 and −1. Based on the generation method, there exist sequences which length is a power of two, e. g. for WH-sequences as shown in (1.1), (1.1) showing orthogonal sequences with length 2 in each line or each column of a matrix $W_{wh}$.

$$W_{wh} = \begin{bmatrix} +1 & +1 \\ +1 & -1 \end{bmatrix} \quad (1.1)$$

Orthogonal sequences based on other construction rules exist also with length multiple of four.

Another type of orthogonal sequences uses a zero (0) and a nonzero (1) symbol. Orthogonal sequences based on 1 and 0 exist with any length. The construction is very simple, because the unit vectors can be used in an embodiment, e. g. (1.2) for sequences of length 3.

$$W_c = \begin{bmatrix} 1 & 0 & 0 \\ 0 & 1 & 0 \\ 0 & 0 & 1 \end{bmatrix} \quad (1.2)$$

The benefit of codes based on +1 and −1 is that the full energy swing of sent signals is used. On the other hand, it is usually necessary to correlate over the full sequence length to get the channel estimation. If there is impulse noise which affects one or more of the training symbols, the complete channel estimation may be corrupted.

With a code based on 1 and 0, after transmission of each symbol, in some cases a part of the channel estimation is available. If one symbol is corrupted by impulse noise, only this part of the channel estimation is corrupted. Due to the fact that only a fraction of the available transmit power is used for channel estimation, the mitigation of noise effects takes more time with this type of code compared to a code based on +1 and −1.

In embodiments, by using codes based on +1, −1 and 0, advantages of both approaches may be combined. For constructing suitable sequences, in some embodiments, the fact is used that any type of orthogonal sequences can be combined to a higher dimension orthogonal sequence, both sequence types (those using zeros and those not using them) can be combined. With the examples above, corresponding sequences of length 6 containing elements +1, 0 and −1 are shown in (1.3).

$$W_{full} = \begin{bmatrix} +1 & +1 & 0 & 0 & 0 & 0 \\ +1 & -1 & 0 & 0 & 0 & 0 \\ 0 & 0 & +1 & +1 & 0 & 0 \\ 0 & 0 & +1 & -1 & 0 & 0 \\ 0 & 0 & 0 & 0 & +1 & +1 \\ 0 & 0 & 0 & 0 & +1 & -1 \end{bmatrix} \quad (1.3)$$

The construction rule in matrix form is the following. The full matrix $w_{full}$ of dimension $N_{out} \cdot N_{in} \times N_{out} \cdot N_{in}$ is constructed with the inner matrix $w_{in}$ of dimension $N_{in} \times N_{in}$ and the outer matrix $W_{out}$ of dimension $N_{out} \times N_{out}$ by the rule (1.4). Each row of the matrix corresponds to one transmission line and each column corresponds to one time instance.

$$W_{full} = \begin{bmatrix} w_{out1,1} \cdot W_{in} & w_{out1,2} \cdot W_{in} & \cdots & w_{out1,N_{out}} \cdot W_{in} \\ w_{out2,1} \cdot W_{in} & w_{out2,2} \cdot W_{in} & \cdots & w_{out2,N_{out}} \cdot W_{in} \\ \cdots & \cdots & \cdots & \cdots \\ w_{outN_{out},1} \cdot W_{in} & w_{outN_{out},2} \cdot W_{in} & \cdots & w_{outN_{out}N_{out}} \cdot W_{in} \end{bmatrix} \quad (1.4)$$

In other words, when in an embodiment sequences are constructed as mentioned above, a first matrix comprising orthogonal sequences of +1 and −1 and a second matrix comprising orthogonal sequences using zero and a non-zero, for example value of one, are provided, and each matrix element of the second matrix with zero and non-zero elements is replaced by the matrix with +1 and −1 multiplied by the respective replaced matrix element of the second matrix.

In the following, various possibilities for using such sequences in various applications will be described in some more detail.

Depending on a desired application and deployment scenario of the sequence, a combined orthogonal sequence consisting of +1, −1 and 0 is constructed differently. Use of zeros e.g. allows excluding some lines from the channel estimation process at specific time and for specific frequency, and thus may allow a powerful control over speed and accuracy of the channel estimation process in some embodiments. In other words, zeros allow creating virtual groups of lines for crosstalk channel estimation.

In an embodiment, for systems having multiple distribution points as e.g. shown in FIG. 4, the above-described construction method can be extended, because it is not required that the inner orthogonal matrices $w_{in}$ are the same type or the same size. However, in embodiments, each inner matrix itself is orthogonal. Therefore, in an embodiment, the construction method can be used to virtually separate the channel estimation process of different distribution points such that each distribution point (e.g. 42A, 42B at FIG. 4) uses its WH- sequence for intra-distribution point channel estimation (e.g. to determine crosstalk at 43) and with additional 0, 1 code points added generate a matrix for inter-distribution point channel estimation (e.g. to determine crosstalk at 44).

Another application in some embodiments may that some of the crosstalkers are very strong and due to limited dynamic range it is beneficial to separate them into different group(s). Use of codes 0, 1 allows to create multiple groups and thus reduce the overall crosstalk into individual lines. Within each group, a WH-sequence or other +1/−1 orthogonal sequence can be used.

There are cases in which only a part of the channel matrix needs to be estimated. One example is that a new line is joining a group of active lines and only the crosstalk from the joining line into the active lines needs to be estimated. In this case, in an embodiment, the new line can transmit a signal while the others are transmitting 0 and the interesting part of the channel is available immediately.

Similarly, partial channel estimation may be helpful to reduce the estimation time in case when part of pairs generates a substantially lower crosstalk (e.g., are in different binder).

In some embodiments, a sequence reconfiguration protocol may be implemented. Due to activation and deactivation of transmissions it may be required to change the orthogonal sequences used for channel estimation in all lines. To keep orthogonality, in an embodiment, all lines switch from the old sequence to the new sequence at the same time. The sequence reconfiguration protocol defines this time and also the start of the sequence. At the selected reconfiguration time communicated to all transceivers of a vectored group, i.e. all devices taking part in the crosstalk reduction, all transceivers in a given transmission direction start transmit the new orthogonal sequence.

Next, possibilities for channel estimation, for example for calculating an estimate of the channel matrix H as mentioned above with respect to FIG. 3, using sequences containing +1, 0 and −1 will be explained in more detail. It is to be noted that other techniques for channel estimation may be used as well.

In embodiments, test sequences, i.e. channel estimation sequences are used to calculate an estimate $H_{est}$ of the channel matrix H. Therefore, for each time instance t, the elements of one column of the channel estimation sequence matrix W (which may be constructed as explained above) are assigned to the transmitters. Each of the transmitters l=1 . . . L, for example transmitters assigned to each of the communication connections 12 in FIG. 1 or each of the communication connections in other embodiments discussed, sends at time instance t the transmit signal $w_{lt}$. The transmit signals of all transmitters at time instance t give the transmit signal vector $u^{[t]}$ according to equation (1.5).

$$u^{[t]} = \begin{bmatrix} w_{1t} \\ \cdots \\ w_{Lt} \end{bmatrix} \quad (1.5)$$

The receivers receive for each time instance a receive signal vector û which is the transmit signal vector u distorted by the channel H and additive noise n as explained above with reference to FIG. 3. After transmission of one complete sequence, the channel estimation in an embodiment is calculated according to equation (1.6).

$$H_{est} = \frac{1}{N_{seq}} \sum_{t=1}^{N_{seq}} \hat{u}^{[t]} \cdot (u^{[t]})^T = \frac{1}{N_{seq}} \sum_{t=1}^{N_{seq}} (H \cdot u^{[t]} + n^{[t]}) \cdot (u^{[t]})^T \approx H \quad (1.6)$$

In some cases, it is beneficial to use the receive signal error according to equation (1.7) instead of the receive signal for channel estimation.

$$e = \hat{u} - u \quad (1.7)$$

The channel estimation based on the receive error in an embodiment is given by equation (1.8).

$$H_{est} - \frac{1}{N_{seq}} \sum_{t=1}^{N_{seq}} u^{[t]} \cdot (u^{[t]})^T =$$
$$\frac{1}{N_{seq}} \sum_{t=1}^{N_{seq}} e^{[t]} \cdot (u^{[t]})^T = \frac{1}{N_{seq}} \sum_{t=1}^{N_{seq}} (H \cdot u^{[t]} - u^{[t]} + n^{[t]}) \cdot (u^{[t]})^T \quad (1.8)$$

For partial channel estimation with sequences including zeros, the correlation sum in embodiments scaled with the diagonal matrix $(WW^T)^{-1}$ instead of $$\frac{1}{N_{seq}},$$

because diagonal elements of $WW^T$ are only for Walsh-Hadamard sequences equal to the sequence length. This gives the modified equation (1.9).

$$H_{est} = I + \left( \sum_{t=1}^{N_{seq}} e^{[t]} \cdot (u^{[t]})^T \right) \cdot (WW^T)^{-1} \quad (1.9)$$

Due to the structure of the sequence containing 0, −1 and +1 in embodiments, parts of the channel estimation $H_{est}$ do not require the correlation over the complete sequence length $N_{seq} = N_{out} \cdot N_{in}$, but only over a fraction of the sequence. For the example of (1.3), correlation over the first two symbols gives the result for $H_{est\ 1\ \ldots\ L\ 1\ \ldots\ 2}$, correlation over the symbols 3 and 4 gives $H_{est\ 1\ \ldots\ L\ 3\ \ldots\ 4}$ and so on.

In multi-carrier systems the channel estimation in some embodiments is done on different carriers, also referred to as subcarriers having different frequencies, also referred to as tones sometimes. Examples for such systems include systems using discrete multi-tone modulation (DMT).

In embodiments, it is possible to use different channel estimation sequences on different subcarriers. Furthermore, it may be considered to employ an additional scrambling in some cases to avoid high signal amplitudes in time domain, which can cause nonlinear distortions.

To make channel estimation faster, in some embodiments, different parts of the channel may be estimated on different (neighboring) subcarriers. One example is that on one subcarrier n, the sequences (1.10) are used, on the next subcarriers n−1 and n+2, the sequences (1.11) and (1.12) are used.

$$W_{tone1} = \begin{bmatrix} +1 & +1 & 0 & 0 & 0 & 0 \\ +1 & -1 & 0 & 0 & 0 & 0 \\ 0 & 0 & +1 & +1 & 0 & 0 \\ 0 & 0 & +1 & -1 & 0 & 0 \\ 0 & 0 & 0 & 0 & +1 & +1 \\ 0 & 0 & 0 & 0 & +1 & -1 \end{bmatrix} \quad (1.10)$$

$$W_{tone2} = \begin{bmatrix} 0 & 0 & 0 & 0 & +1 & +1 \\ 0 & 0 & 0 & 0 & +1 & -1 \\ +1 & -1 & 0 & 0 & 0 & 0 \\ +1 & -1 & 0 & 0 & 0 & 0 \\ 0 & 0 & +1 & +1 & 0 & 0 \\ 0 & 0 & +1 & -1 & 0 & 0 \end{bmatrix} \quad (1.11)$$

$$W_{tone3} = \begin{bmatrix} 0 & 0 & +1 & +1 & 0 & 0 \\ 0 & 0 & +1 & -1 & 0 & 0 \\ 0 & 0 & 0 & 0 & +1 & +1 \\ 0 & 0 & 0 & 0 & +1 & -1 \\ +1 & +1 & 0 & 0 & 0 & 0 \\ +1 & -1 & 0 & 0 & 0 & 0 \end{bmatrix} \quad (1.12)$$

On each of the neighboring subcarriers, in an embodiment, another part of the channel matrix is estimated at each part of the overall orthogonal sequences. By interpolation over the tones, an approximation of the complete channel estimation is available after a shorter time. The approximation can be adjusted in the following symbols.

While for frequency independent channel estimation sequences, inserting zeros reduces the overall energy used for channel estimation, this is not necessarily the case for frequency dependent channel estimation sequences. As tones transmitting Walsh-Hadamard sequences are uniformly distributed over frequency and zeros are in between, the time domain signal is an interpolated version of the time domain signal without insertion of zeros. Therefore, it is allowed in embodiments to scale the time domain signal such that the full transmit power and maximum transmit power spectral density (PSD) is used.

On channels with strong crosstalk the scaling in time domain may be applied in embodiments with respect to the limited dynamic range of the receivers.

In another embodiment, pilot tones may be interleaved with tones used for data. This way channel estimation may be performed continuously, with m tones per symbol. The tones used for pilot sequence may shift after every or a certain number of pilot sequences passed.

In another embodiment of vectored multicarrier transmission, the tone spacing doesn't allow using frequency interpolation. In this case, more symbols with pilot sequences may be sent in embodiments. If the lines filling the cable binder are divided into several vectored groups by using the mentioned sequences, different vectored group may be estimated in different time, i.e., using different groups of pilot/probe symbols.

The above-described embodiments are only to be taken as some application examples where sequences consisting of +1, −1 and 0 may be used for channel estimation, but are not to be construed as limiting. For example, such channel estimation sequences (test sequences) may also be constructed differently for different applications.

What is claimed is:

1. A method, comprising:
defining channel estimation sequences based on values of +1, −1 and 0, and
using the channel estimation sequences for channel estimation in a communication system using a plurality of communication connections,
wherein the channel estimation sequences comprise a plurality of orthogonal sequences which are constructed based on inner orthogonal sequences and outer orthogonal sequences, and
wherein the channel estimation sequences are constructed such that the inner orthogonal sequences are used for estimating crosstalk between communication connections assigned to a same distribution point of said communication system, and wherein the outer orthogonal sequences are usable for estimating crosstalk between communication connections associated with different distribution points.

2. The method of claim 1, wherein said communication system employs multi-carrier transmission, wherein said zeros of said channel estimation sequences are used only on some of the carriers of the multi-carrier transmission.

3. The method of claim 1, wherein defining said channel estimation sequences comprises defining a combined orthogonal sequence including +1, −1 and 0, at least a portion of the sequence for use with one or more pilot symbols in the communication system, and at least one or more zeros of the sequence being included from a channel estimation process at least at a particular instant, and
Wherein said channel estimation is performed using the combined orthogonal sequence.

4. The method of claim 1, wherein the inner orthogonal sequences are writable as a first matrix, and wherein the outer orthogonal sequences are writable as a second matrix, wherein the construction comprises replacing each element of the second matrix by a multiplication of the respective element of the second matrix with the first matrix.

5. The method of claim 1, wherein the outer orthogonal sequences are formed by unit vectors.

6. The method of claim 1, wherein the inner orthogonal sequences are formed by Walsh-Hadamard sequences.

7. The method of claim 1, wherein a group of communication connections for which a crosstalk channel is to be estimated by said channel estimation with the inner orthogonal sequences is selected with respect to a limited dynamic range of a receiver of the channel estimation sequences.

8. The method of claim 1, further comprising speeding up said channel estimation by sending values of zero of the channel estimation sequences on some of said communication connections.

9. The method of claim 1, further comprising estimating different parts of an overall communication connection on neighboring carriers of a multi-carrier transmission and estimating the complete communication channel on the communication connection by interpolation over frequency.

10. The method of claim 1, further comprising scaling symbols used to carry the transmit sequences for channel estimation with values of zero of said channel estimation sequences on some carriers of a multi-carrier transmission to increase a transmit power of training symbols on other carriers.

* * * * *